United States Patent
Feng et al.

(10) Patent No.: US 11,754,494 B2
(45) Date of Patent: Sep. 12, 2023

(54) DEVICE AND METHOD FOR SIMULTANEOUSLY MEASURING MERCURY, CADMIUM, ZINC AND LEAD

(71) Applicant: CHANGSHA KAIYUAN HONGSHENG TECHNOLOGY CO., LTD, Hunan (CN)

(72) Inventors: Li Feng, Hunan (CN); Guo Sun, Hunan (CN); Te Xiao, Hunan (CN)

(73) Assignee: CHANGSHA KAIYUAN HONGSHENG TECHNOLOGY CO., LTD, Hunan (CN)

( * ) Notice: Subject to any disclaimer, the term of this patent is extended or adjusted under 35 U.S.C. 154(b) by 619 days.

(21) Appl. No.: 16/965,303

(22) PCT Filed: Nov. 21, 2019

(86) PCT No.: PCT/CN2019/119851
§ 371 (c)(1),
(2) Date: Jul. 28, 2020

(87) PCT Pub. No.: WO2021/082117
PCT Pub. Date: May 6, 2021

(65) Prior Publication Data
US 2023/0160813 A1    May 25, 2023

(30) Foreign Application Priority Data
Oct. 29, 2019   (CN) .......................... 201911038388.3

(51) Int. Cl.
*G01N 21/31*   (2006.01)
*G01N 21/72*   (2006.01)

(52) U.S. Cl.
CPC ......... *G01N 21/3103* (2013.01); *G01N 21/72* (2013.01); *G01N 2021/3114* (2013.01)

(58) Field of Classification Search
CPC .... G01N 21/3103; G01N 21/72; G01N 21/68; G01N 21/74; G01N 2021/3114
See application file for complete search history.

(56) References Cited

U.S. PATENT DOCUMENTS 3,544,789 A * 12/1970 Wieder .............. G01N 21/3103
356/307
4,300,834 A * 11/1981 Demers ................. G01N 21/73
356/417
(Continued)

FOREIGN PATENT DOCUMENTS

CN   102967590 A  *  3/2013
CN   102967590 A     3/2013
(Continued)

OTHER PUBLICATIONS

Search Report dated Nov. 12, 2021 for European patent application No. 19908071.4, 10 pages.
(Continued)

*Primary Examiner* — Sang H Nguyen
(74) *Attorney, Agent, or Firm* — Yue (Robert) Xu; Apex Attorneys at Law, LLP

(57) ABSTRACT

A device for simultaneously measuring mercury, cadmium, zinc, and lead is provided, including: a gas generating device; a quartz analysis tube connected to the gas generating device, and the quartz analysis tube includes a sample heating zone, a high-temperature packing zone and a quartz collimating tube; an atomic absorption detection device AA1 arranged behind the quartz analysis tube, where the atomic absorption detection device includes an atomic absorption detector, a flame, and a light source; a quartz catalytic tube arranged behind the atomic absorption detection device, where the quartz catalytic tube includes a flame buffer zone and an adsorption packing zone; and an atomic absorption mercury measuring device arranged behind the quartz cata-
(Continued)

lytic tube, where the atomic absorption mercury measuring device includes a mercury enrichment tube, an atomic absorption detector AA2 and an air pump.

10 Claims, 2 Drawing Sheets

(56) References Cited

U.S. PATENT DOCUMENTS

| | | | | |
|---|---|---|---|---|
| 4,867,562 | A | * | 9/1989 | Oishi ............... G01N 21/3103 |
| | | | | 356/312 |
| 5,434,665 | A | * | 7/1995 | Tobe ..................... G01N 21/74 |
| | | | | 356/312 |
| 5,786,887 | A | * | 7/1998 | Ebata .................... G01N 21/71 |
| | | | | 356/73 |
| 5,822,059 | A | * | 10/1998 | Tobe ..................... G01N 21/74 |
| | | | | 356/312 |
| 5,879,948 | A | | 3/1999 | Van Pelt et al. |
| 2006/0246594 | A1 | * | 11/2006 | Appel ............... G01N 21/6408 |
| | | | | 436/81 |
| 2006/0285108 | A1 | * | 12/2006 | Morrisroe ............ F23C 99/003 |
| | | | | 219/121.48 |

FOREIGN PATENT DOCUMENTS

| | | | |
|---|---|---|---|
| CN | 104865206 | A | 8/2015 |
| CN | 205861540 | U * | 1/2017 |
| CN | 205861540 | U | 1/2017 |
| CN | 108007911 | A | 5/2018 |
| EP | 2921844 | A1 | 9/2015 |
| WO | 2009090608 | A1 | 7/2009 |

OTHER PUBLICATIONS

Costley Claire t et al., "Determination of mercury in environmental and biological samples using pyrolysis atomic absorption spectrometry with gold amalgamation", Analytica Chimica Acta, vol. 405, No. 1-2, Jan. 1, 2000, pp. 179-183.

Rawar Ellsya Angeline et al., "Validation of atomic absorption spectrophotometry and mercury analyzer for analysis of cadmium, lead and mercury in red chili pepper", Asian Lournal of Agricultural Research, vol. 10,No. 1, Jan. 1, 2016, pp. 65-71.

International Search Report for PCT/CN2019/119851 dated May 28, 2020, ISA/CN.

CNIPA First Office Action corresponding to Application No. 201911038388.3; dated Apr. 2, 2020.

Mao, Xuefei, Study on Determination of Cadmium and Mercury in Agri-foods by Solid Sampling Electrothermal Vaporization Spectrometry Using Atomic Traps, China Doctoral Dissertations Fulltext Database, Oct. 15, 2015, Sections 6.3, 6.4, 7.3 and 7.4.

Li, Xiaochen, etc., Comparison of Analysis Performance for Cd,Cr,Cu,Mn,Pb between the Field-portable Atomic Absorption Spectrometer (AAS) and Conventional Graphite Furnace AAS, Modern Scientific Instruments, Jun. 30, 2010, No. 3, sections 1-3 and tables 1-2.

Wang, Bo, etc., Direct determination of trace mercury and cadmium in food by sequential electrothermal vaporization atomic fluorescence spectrometry using tungsten and gold coil traps, J.Anal.At. Spectrom, May 4, 2018, No. 7 vol. 33, parts 2 and 3.

Lu, Shaokun, etc., Determination of Soil Available Nutrient Contents Using Multi-Element Hollow Cathode Lamp, Spectroscopy and Spectral Analysis, Jul. 31, 2011, pp. 1930-1934, vol. 31, No. 7.

* cited by examiner

DEVICE AND METHOD FOR SIMULTANEOUSLY MEASURING MERCURY, CADMIUM, ZINC AND LEAD

The present application is a National Phase entry of PCT Application No. PCT/CN2019/119851, filed on Nov. 21, 2019, which claims the priority to Chinese patent application No. 201911038388.3 titled "DEVICE AND METHOD FOR SIMULTANEOUSLY MEASURING MERCURY, CADMIUM, ZINC AND LEAD", filed with the China National Intellectual Property Administration on Oct. 29, 2019, which are incorporated herein by reference in their entireties.

FIELD

The present disclosure relates to the technical field of analytical chemistry, and in particular to a device and method for simultaneously measuring mercury, cadmium, zinc and lead.

BACKGROUND

At present, for measuring trace mercury, cadmium, zinc, lead and other heavy metal elements in complex matrix liquids and solids, a conventional method is to use electrothermal-atomic spectroscopy, hydride-atomic spectroscopy, plasma emission spectroscopy/mass spectrometry and other analytical methods to analyze after a sample is subjected to sample pretreatment processes such as dissolution, extraction, and enrichment that the sample is converted into a liquid sample with a simple matrix. These conventional methods require more time, labor, and material costs.

At present, methods for direct injection analysis of trace heavy metal elements are continuous light source-graphite furnace atomic absorption method, cadmium electrothermal evaporation-tungsten wire enrichment-atomic fluorescence method, mercury combustion-catalytic combustion-gold amalgam cold atomic absorption method, zinc electrothermal evaporation-tungsten wire enrichment-inductively coupled plasma mass spectrometry method, X-ray fluorescence method, neutron activation method and LIBS, etc. Although X-ray fluorescence and LIBS analysis methods can also directly measure these elements, the quantification limit of the methods is generally above 10 mg/kg, which is not suitable for measuring requirements of heavy metal elements with lower content; the operation of the neutron activation method is more complicated and costly; in the application of continuous light source-graphite furnace atomic absorption method, the sample is placed in the graphite furnace to be heated and detected in situ in the graphite tube, so the injection volume is only allowed to be less than a few milligrams, and the analysis of some samples may lack the representativeness of the sample and is not easy to operate; cadmium electrothermal evaporation-tungsten wire enrichment-atomic fluorescence method (U.S. Pat. No. 8,969,832B2), mercury combustion-catalytic combustion-gold amalgam cold atomic absorption method (reference W. Frech, D C Baxter, G Dyvik, B. Dybdahl, On the measurement of total mercury in natural gases using the amalgamation technique and cold vapor atomic-absorption spectrometry, J. Anal. At. Spectrom. 1995, 10 769-775.), zinc electrothermal evaporation-tungsten wire enrichment-inductively coupled plasma mass spectrometry (Chinese patent 201510409052.9) method can only analyze one element at a time.

Therefore, it is necessary to provide a sample injection method and detection method without chemical pretreatment to achieve direct injection and simultaneously or individually accurate analysis of the heavy metal elements such as mercury, cadmium, zinc, and lead in complex matrix liquids and solids.

SUMMARY

In view of this, a technical problem to be solved by the present application is to provide a device for simultaneously or individually measuring mercury, cadmium, zinc, and lead; and the device of the present application can achieve the simultaneous measurement of mercury, cadmium, zinc, and lead with high accuracy.

Compared with the conventional technology, a device for simultaneously measuring mercury, cadmium, zinc and lead is provided according to the present application, which includes: a gas generating device; a quartz analysis tube connected to the gas generating device, where the quartz analysis tube includes a sample heating zone, a high-temperature packing zone and a quartz collimating tube arranged in a listed sequence; an atomic absorption detection device AA1 arranged behind the quartz analysis tube, in which the atomic absorption detection device includes an atomic absorption detector, a flame, and a light source; a quartz catalytic tube arranged behind the atomic absorption detection device, in which the quartz catalytic tube comprises a flame buffer zone and an adsorption packing zone arranged in a listed sequence; and an atomic absorption mercury measuring device arranged behind the quartz catalytic tube, in which the atomic absorption mercury measuring device includes a mercury enrichment tube, an atomic absorption detector AA2 and an air pump arranged in a listed sequence. In the present application, the sample undergoes combusting and pyrolyzing at high temperature in the sample heating zone to decompose the organic matter, and volatile matter is further decomposed by the high-temperature packing and purged out of the analysis pipeline system and enters the atomic absorption mercury measuring device AA1, and at the same time partially volatile elements such as cadmium, zinc, and lead during the combustion are selectively captured by the high-temperature packing in the high-temperature packing zone. By gently switching the heating atmosphere to a reducing atmosphere, cadmium, lead, and zinc are released from the combustion ash and the packing in the high-temperature packing zone, and sent to the atomic absorption detector for measurement. The device of the present application can achieve the simultaneous measurement of mercury, cadmium, zinc, and lead with high accuracy.

DETAILED DESCRIPTION

A device for simultaneously measuring mercury, cadmium, zinc, and lead and a method thereof are provided according to the present application. Those skilled in the art can refer to the content of the present application and appropriately improve the process parameters to achieve. It should be particularly pointed out that all similar replacements and modifications are obvious to those skilled in the art, and they all fall within the protection scope of the present application. The method and application of the present application have been described through preferred embodiments, and it is obvious that relevant personnel can obviously modify or appropriately modify and combine the methods and applications herein to achieve and apply the technology of the present application without departing from the content, spirit and scope of the present application.

A device for simultaneously measuring mercury, cadmium, zinc, and lead is provided according to the present application, which includes:

a gas generating device;

a quartz analysis tube connected to the gas generating device; in which the quartz analysis tube includes a sample heating zone, a high-temperature packing zone and a quartz collimating tube arranged in a listed sequence;

an atomic absorption detection device AA1 arranged behind the quartz analysis tube; in which the atomic absorption detection device includes an atomic absorption detector, a flame, and a light source;

a quartz catalytic tube arranged behind the atomic absorption detection device; in which the quartz catalytic tube includes a flame buffer zone and an adsorption packing zone arranged in sequence; and an atomic absorption mercury measuring device arranged behind the quartz catalytic tube; in which the atomic absorption mercury measuring device includes a mercury enrichment tube, an atomic absorption detector AA2 and an air pump arranged in a listed sequence, and the AA2 mentioned in the present application is disclosed by the patent CN204649610U, and the patent right belongs to the owner of the present application.

The device for simultaneously measuring mercury, cadmium, zinc and lead according to the present application includes a gas generating device 1. The gas generating device includes an air generator and a nitrogen-hydrogen mixer generator.

Figure 2:
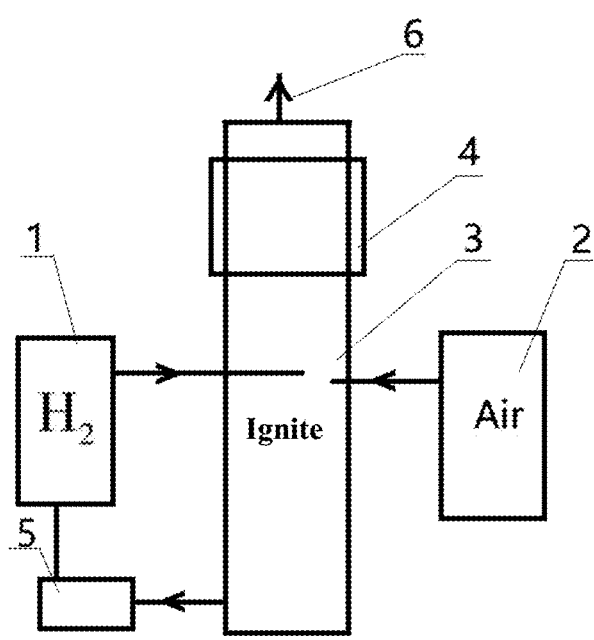
FIG. 2 is a schematic view showing the structure of a nitrogen-hydrogen mixer generator according to the present application.

In the present application, the air generator is not limited, and may be commercially available that is well known to those skilled in the art. The nitrogen-hydrogen mixer generator of the present application may be preferably shown in FIG. 2, and FIG. 2 is a schematic view showing the structure of a nitrogen-hydrogen mixer generator according to by the present application.

It specifically includes:

the nitrogen/hydrogen generator comprises:

an air source (2);

a hydrogen generating device (1);

a combustion head configured to ignite air and hydrogen; and a water vapor structure (3) configured to condense water vapor generated by combustion, in which the water vapor structure (3) is provided with an air inlet connected to the air source (2), a hydrogen inlet connected to the hydrogen generating device (1), and a generated gas outlet (6) arranged at a top of the water vapor structure (3).

In the nitrogen-hydrogen mixer generator according to an embodiment of the present application, the air source 2 fills the water vapor structure 3 with air through the air inlet, and the hydrogen generating device 1 fills the water vapor structure 3 with hydrogen through the hydrogen inlet, and the air and the hydrogen are combusted through the combustion head. The main reaction chemical equation is:

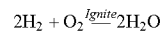

It can be seen that the oxygen in the air can be effectively removed by combustion; and the water vapor generated by the combustion is condensed in the water vapor structure 3 to separate the generated gas from the condensed water, and the generated gas flows out from the generated gas outlet 6 at the top of the water vapor structure 3. Compared with the conventional technology that using a molecular sieve as the adsorbent and using pressure swing adsorption principle to separate the air to produce nitrogen, the structure of the deoxygenation device is simple, which effectively reduces the cost of the deoxygenation device and can also reduce the volume of the deoxygenation device according to the requirements.

The ratio of the air and the hydrogen may be adjusted to make the hydrogen completely react with the oxygen, leaving the nitrogen as the generated gas.

The ratio of the air and the hydrogen may also be adjusted to make all of the oxygen react with part of the hydrogen, leaving the mixed gas of left nitrogen and another part of hydrogen as the generated gas. As follows:

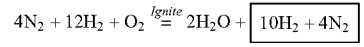

The generated gas is nitrogen or the mixed gas of nitrogen and hydrogen, both of which do not contain oxygen components. The generated gas may be used for analytical instruments, such as an instrument for hydride generation atomic fluorescence/absorption, a hyphenated instrument for electrothermal evaporation spectroscopy/mass spectrometry, a special analyzer for lead, cadmium, mercury and arsenic and so on.

In order to accelerate the separation of the generated gas and the condensed water, the nitrogen-hydrogen mixer generator according to an embodiment of the present application further includes a refrigerator 4 for accelerating the condensation of water vapor; the refrigerator 4 is located between the combustion zone and the generated gas outlet 6; the combustion zone is a zone where hydrogen and air combust in the water vapor structure 3, that is, the generated gas is required to be cooled by the refrigerator 4 before flowing out through the generated gas outlet 6, which ensures the condensation effect and accelerates the condensation of the water vapor.

The refrigerator 4 is provided outside the water vapor structure 3; the cooling part of the refrigerator 4 is in temperature-conducting contact with an outer housing of the water vapor structure 3. Through the above arrangement, the refrigerator 4 is made independent of the outside of the water vapor structure 3 to prevent the condensed water or the water vapor from eroding the refrigerator 4 and effectively increase the service life of the refrigerator 4.

Preferably, the refrigerator 4 is a semiconductor refrigerator and may also be set to other types of refrigerators, which will not be repeated here.

The combustion head is arranged in the water vapor structure 3. The combustion head may also be arranged outside the water vapor structure 3, so that the combustion head ejects sparks or flames into the water vapor structure 3. It only needs to enable the combustion head to ignite the mixed gas of the hydrogen and the air in the water vapor structure 3.

The nitrogen-hydrogen mixer generator according to the embodiment of the present application further includes a water removing structure for removing condensed water in the water vapor structure 3. Since the combustion of air and hydrogen will generate water, in order to avoid the water affecting the use of subsequent gas (nitrogen), the water removing structure may be provided.

In this embodiment, a water outlet is provided at the bottom of the water vapor structure 3, and the water removing structure includes a pump 5. A water inlet of the pump 5 is in communication with the water outlet, and a water outlet of the pump 5 is in communication with a water inlet of the hydrogen generating device 1. Through the above arrangements, the recycling of the composition is achieved.

Preferably, the pump 5 is a peristaltic pump.

In order to prevent the moisture from flowing out from the generated gas outlet 6, a semi-permeable membrane, which is permeable to gas and not to water molecules, is provided at the generated gas outlet 6. Dry particles and the like may be provided at the generated gas outlet 6.

An air switching valve for controlling opening and closing of the air inlet is provided at the air inlet; and a hydrogen switching valve for controlling opening and closing of the hydrogen inlet is provided at the hydrogen inlet. By controlling the opening degree and opening time of the air switching valve and the hydrogen switching valve, and according to the flow rate of the air and the hydrogen into the water vapor structure 3, the ratio of the air and the hydrogen may be adjusted to achieve the effect of controlling the composition of the generated gas. The generated gas may be only nitrogen, or the generated gas may be a mixed gas of nitrogen and hydrogen.

In order to improve the degree of automation, the nitrogen-hydrogen mixer generator may further include a control device that controls the amount of hydrogen entering the water vapor structure 3 from the hydrogen inlet and a control device that controls the amount of air entering the water vapor structure 3 from the air inlet. The control device can adjust the opening degree of the air switch valve according to the flow rate of the air through the air inlet and the control device can adjust the opening degree of the hydrogen switch valve according to the flow rate of the hydrogen through the hydrogen inlet, thereby completing the adjustment of the amount of hydrogen and air.

In order to ensure complete combustion, it is necessary to ensure the closure of the water vapor structure 3 during the combustion process. Therefore, an outlet switching valve for controlling the opening and closing of the outlet of the generated gas outlet 6 is provided at the outlet of the generated gas outlet 6.

The flow control can be achieved by adjusting the opening degree of the above switching valve.

A method for generating a nitrogen-hydrogen mixer (deoxygenation method) is further provided according to an embodiment of the present application, using any one of the above nitrogen-hydrogen mixer generators.

The method includes the following steps:

mixing hydrogen and air to form a mixed gas; in which the mixing ratio of hydrogen and air is adjusted according to the required composition of the generated gas (such as nitrogen or a mixed gas of nitrogen and hydrogen); and allowing the mixed gas to be fully combusted and outputting the generated gas.

Since the above deoxygenation device has the above technical effects, the above deoxygenation method should also have the same technical effects, which will not be described herein.

Preferably, in the step of mixing hydrogen and air to form the mixed gas, the ratio of the volume of hydrogen to the volume of the predicted oxygen content in the air is 2:1 by controlling the ratio of the hydrogen to the air.

The principle is: to obtain a mixture of nitrogen and hydrogen, the excess hydrogen provided by the air and hydrogen generator is ignited, and the oxygen in the air is consumed, and the generated water vapor is condensed, so as to obtain a dry mixture of nitrogen and hydrogen, and the oxygen content of this mixed gas is less than 5 ppm.

The device for simultaneously measuring mercury, cadmium, zinc, and lead according to the present application includes a quartz analysis tube connected to the gas generating device.

The quartz analysis tube of the present application includes a sample heating zone, a high-temperature packing zone, and a quartz collimation tube arranged in a listed sequence.

That is, the sample heating zone 2, the high-temperature packing zone 3 and the quartz collimating tube 4 are communicated in a listed sequence, and the whole of the sample heating zone 2, the high-temperature packing zone 3 and the quartz collimating tube 4 is called the quartz analysis tube.

The air flow enters into the integrated combustion catalytic quartz tube including the sample heating zone, the high-temperature packing zone and the quartz collimating tube, enters from a left end of the sample heating zone, and exits from a rightmost end of the quartz collimating tube; and the integrated quartz tube includes the sample heating zone, the high-temperature packing zone and the quartz collimating tube.

In the quartz analysis tube, the sample heating zone has an inner diameter of 19 mm, an outer diameter of 22 mm, and a length of 30 mm to 200 mm; the high-temperature packing zone has an inner diameter of 19 mm, an outer diameter of 22 mm, and a length of 30 mm to 200 mm; and the quartz collimating tube has an outer diameter of 4 mm, an inner diameter of 2 mm, and a length of 5 mm to 100 mm.

The gas generating device, the sample heating zone, the high-temperature packing zone, and the quartz collimating tube form a gas-tight transmission flow path, and the motive gas is provided by the gas generating device.

The integrated quartz tube including 2, 3, 4 is provided in a tube furnace, so that the quartz tube including 2, 3, 4 may be heated to 1100 degrees. Zone 2 is heated to 0 to 1100 degrees to achieve program temperature increasing, thereby removing moisture and decomposing organic matter in the sample. Moisture and combustion products pass through zone 3. The temperature of zone 3 is between 800 degrees and 900 degrees, preferably 850 degrees. The zone 3 is filled with magnesium oxide, calcium oxide or kaolin particles used to absorb cadmium, lead, zinc and other elements partially carried in the combustion flue gas. 4 is the quartz collimating tube, which can aggregate the analytes released from 2 and 3 into a beam, and 4 is heated to 800 degrees to 900 degrees by the tube furnace, preferably 850 degrees.

Preferably, the packing in the high-temperature packing zone according to the present application is magnesium oxide, calcium oxide or kaolin; more preferably magnesium oxide, which has a specific surface area of 2 $m^2$/g to 300 $m^2$/g, and a packing mesh number of 10 mesh to 80 mesh. In the present application, the source of the magnesium oxide is not limited, as lone as it is commercially available.

The device for simultaneously measuring mercury, cadmium, zinc, and lead according to the present application includes the atomic absorption detection device AA1 arranged behind the quartz analysis tube.

The atomic absorption detection device includes an atomic absorption detector 7, a flame 5, and a light source 6. 6-1 refers to a full spectrum light of the light source, 6-2 refers to a lens, and 6-3 refers to a characteristic spectrum; and 7 refers to a scanning optical fiber spectrometer, 7-1, 7-2 and 7-3 refer to internal optical structure components, which are not limited to the market, and 7-4 refers to an emergent light.

The atomic absorption detector 7 is a CCD scanning optical fiber spectrometer; and the light source 6 is a lamp with composite elements of the cadmium, zinc and lead elements, preferably a hollow cathode lamp of cadmium, zinc and lead or a glow discharge lamp.

The device for simultaneously measuring mercury, cadmium, zinc, and lead according to the present application includes a quartz catalytic tube arranged behind the atomic absorption detection device; and the quartz catalytic tube includes a flame buffer zone 8 and an adsorption packing zone 9 arranged in a listed sequence.

According to the present application, the quartz catalytic tube has an inner diameter of 19 mm, an outer diameter of 22 mm, and a length of 30 mm to 200 mm; the flame buffer zone has a length of 5 mm to 100 mm; and the packing in the adsorption packing zone is at least one of calcium oxide and manganese dioxide.

The device for simultaneously measuring mercury, cadmium, zinc, and lead according to the present application includes an atomic absorption mercury measuring device arranged behind the quartz catalytic tube; and the atomic absorption mercury measuring device includes a mercury enrichment tube 10, an atomic absorption detector 11 and an air pump 12 arranged in a listed sequence.

During the combustion after air is introduced, the combustion products ejected from the right end of 4 form a stable high-speed airflow 5, which is injected into the quartz tube 8 of the mercury measuring system B, 8 and 9, 10 all refer to quartz tubes, and the diameter of 9 and the diameter of 8 are the same. The quartz tube 9 is packed with oxide particles of calcium oxide and manganese dioxide to absorb acid gas and nitrogen oxides generated during the combustion process, and at the same time to completely decompose the uncombusted organic matter. The quartz tube 10 is packed with gold-plated quartz sand to enrich the mercury element in the combustion products.

11 refers to a dual-beam cold-atom fluorescence mercury measuring device, which is used for detecting the mercury released through the pyrolysis from 10. 12 refers to an air suction pump, which is used for providing the motive gas for the combustion products ejected from the end of 4 flowing in 8, 9, 10, and 11. 5, 8, 9, 10, 11 and 12 form a gas-tight transmission flow path, and the motive gas is provided by 12.

According to the present application, the mercury enrichment tube has an inner diameter of 3 mm, an outer diameter of 5 mm, and a length of 30 mm to 150 mm.

The mercury enrichment tube is packed with gold-plated quartz sand. The mercury enrichment tube is connected to an outlet of the adsorption packing zone.

Figure 1:
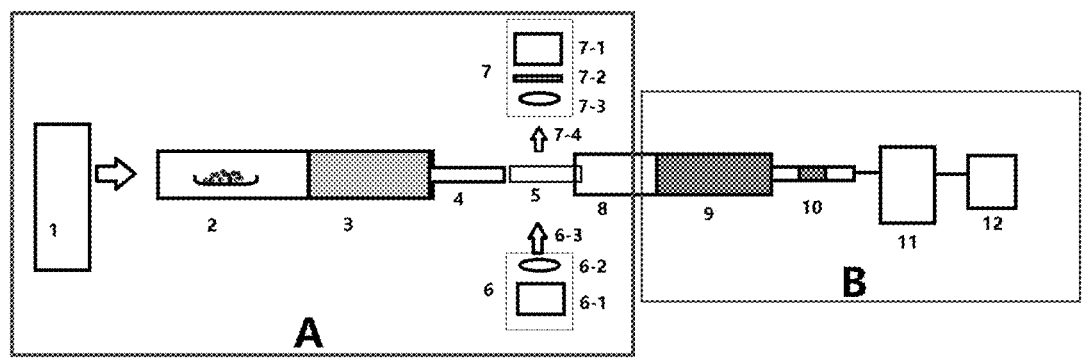
FIG. 1 is a schematic view of a device according to the present application.

FIG. 1 is a schematic view of a device according to the present application.

A method for simultaneously measuring mercury, cadmium, zinc and lead by the device according to any one of the above technical solutions is provided according to the present application, which includes:

A) under an air atmosphere, combusting and pyrolyzing the sample in the sample heating zone, in which part of cadmium, zinc, and lead are selectively captured by the high-temperature packing, and the mercury element is purged into the atomic absorption mercury measuring device for measurement; and B) switching to a nitrogen/hydrogen atmosphere, in which the sample continues to be heated, the gas purges the quartz tube, cadmium, zinc, and lead are released from the sample ash and the packing, and enter the atomic absorption detector AA1 for detection.

According to the present application, the sample is first combusted and pyrolyzed in the sample heating zone under the air atmosphere, and part of the cadmium, zinc and lead in the flue gas are selectively captured by the high-temperature packing, and the mercury element enters the atomic absorption mercury measuring device for measurement after the atmosphere is switched.

The heating temperature of the sample heating zone is 200° C. to 1100° C.; the heating temperature of the high-temperature packing zone is 500° C. to 1100° C.; and the heating temperature of the quartz collimating tube is 500° C. to 1100° C.

According to the present application, the air flow rate is 200 ml/min to 1000 ml/min; more preferably 350 ml/min to 500 ml/min.

The sample is combusted and decomposed through the program heating to remove moisture and decompose organic matter in the sample; the packing zone is used to absorb the cadmium, lead, zinc and other elements partially carried in the combustion flue gas; the quartz collimating tube may aggregate the analytes released from zones 2 and 3 into a beam, and the combustion products ejected from the right end of 4 form a stable high-speed gas flow 5, which is injected into the quartz tube 8 of the mercury measuring system B. The quartz tube 9 is packed with oxide particles of calcium oxide and manganese dioxide to absorb acid gas and nitrogen oxides generated during the combustion process, and at the same time to completely decompose the uncombusted organic matter. The quartz tube 10 is packed with gold-plated quartz sand to enrich the mercury element in the combustion products.

After the combustion process is completed, the combustion products are pumped into unit B to complete the accurate measurement of the mercury in the sample. The sample completes the combustion process in system A, in fact, it also removes a large amount of complex organic matrix in the sample, and obtains a relatively simple inorganic matrix.

The method for measuring mercury according to the present application is: the atomic absorption detector AA1 is a CCD scanning optical fiber spectrometer; an analysis wavelength of cadmium is 228.8 nm, an analysis wavelength of zinc is 213.8 nm, and an analysis wavelength of lead is 283.3 nm; and the specific measurement parameters are not limit in the present application, as long as they are those that are well known to those skilled in the art.

After switching to a nitrogen/hydrogen atmosphere, the sample continues to be heated, the gas purges the quartz tube, and cadmium, zinc, and lead are released and enter the atomic absorption detector AA1 for detection.

The atmosphere in 1 is switched to a mixture of nitrogen and hydrogen. When the atmosphere in 2, 3, and 4 is switched to the mixture of nitrogen and hydrogen, the combustion ash of the sample in 2 and the cadmium, zinc, and lead and other elements that may be adsorbed in 3 are rapidly released under the reducing atmosphere of hydrogen, and are carried by the nitrogen-hydrogen mixed gas through 4, 4 refers to a quartz collimating tube, which may aggregate and concentrate the analytes released in 2 and 3 into a beam at the end of 4, entering the atmosphere.

Since 4 is maintained at a high temperature of 800 to 900 (850 degrees), the nitrogen and hydrogen gas ejected from the end of 4 is ignited to form the flame 5. Cadmium, zinc, lead and other elements are atomized in the flame. Under the irradiation of the characteristic spectrum 6-3, atomic cadmium, zinc, lead and other elements selectively absorb light, and the light 7-4 attenuated by the flame is detect by 7, thereby obtaining the content of cadmium, zinc, lead and other elements. In particular, 6 is a hollow cathode lamp of cadmium, zinc, lead and other elements or other glow discharge lamps, and also includes a lamp with their composite elements. 7 is an atomic absorption detector, which may use a narrow-band filter and a photomultiplier tube (PMT) or a CCD scanning fiber spectrometer. The former is suitable for single-element analysis, and the latter may be suitable for multi-element or single-element analysis. In particular, 6 is a lamp with composite elements of cadmium, zinc, lead and other elements. Other special emphasis is that the nitrogen-hydrogen diffusion flame formed at the end of 4 is an atomizer, and there is no re-ignition after the end of 4 is transmitted through the cold end.

AA1 includes three parts 5, 6, and 7, and AA2 refers to 11.

In the present application, the ratio of the nitrogen/hydrogen mixed gas is nitrogen: hydrogen=1 to 10:1, and the flow rate is 100 mL/min to 1000 mL/min.

The flow rate of the suction pump is 100 mL/min to 1500 mL/min.

In the present application, the specific measurement parameters are not limited, and those skilled in the art may be well known.

A device for simultaneously measuring mercury, cadmium, zinc and lead is provided according to the present application, which includes: a gas generating device; a quartz analysis tube connected to the gas generating device, in which the quartz analysis tube includes a sample heating zone, a high-temperature packing zone and a quartz collimating tube arranged in a listed sequence; an atomic absorption detection device AA1 arranged behind the quartz analysis tube, in which the atomic absorption detection device includes an atomic absorption detector, a flame, and a light source; a quartz catalytic tube arranged behind the atomic absorption detection device, in which the quartz catalytic tube includes a flame buffer zone and an adsorption packing zone arranged in sequence; and an atomic absorption mercury measuring device arranged behind the quartz catalytic tube, in which the atomic absorption mercury measuring device includes a mercury enrichment tube, an atomic absorption detector AA2 and an air pump arranged in a listed sequence. In the present application, the sample undergoes combusting and pyrolyzing at high temperature in the sample heating zone to decompose the organic matter, and volatile matter is further decomposed by the high-temperature packing and purged out of the analysis pipeline system and enters the atomic absorption mercury measuring device AA1, and at the same time partially volatile elements such as cadmium, zinc, and lead during the combustion are selectively captured by the high-temperature packing in the high-temperature packing zone. By gently switching the heating atmosphere to a reducing atmosphere, cadmium, lead, and zinc are released from the combustion ash and the packing in the high-temperature packing zone, and sent to the atomic absorption detector for measurement. The device of the present application can achieve the simultaneous measurement of mercury, cadmium, zinc, and lead with high accuracy.

In order to further illustrate the present application, a device and a method for simultaneously measuring mercury, cadmium, zinc, and lead according to the present application will be described in detail below in conjunction with the embodiments.

First Embodiment

The device is assembled according to the present application: a gas generating device including an air generator and a nitrogen-hydrogen mixer generator; a quartz analysis tube connected to the gas generating device; the quartz analysis tube includes a sample heating zone having an outer diameter of 22 mm and an inner diameter of 19 mm, a high-temperature packing zone (with magnesium oxide particles) having an outer diameter of 22 mm and an inner diameter of 19 mm and a quartz collimating tube having an outer diameter of 4 mm and inner diameter 2 mm arranged in a listed sequence; an atomic absorption detection device arranged behind the quartz analysis tube; the atomic absorption detection device includes an atomic absorption detector AA1, a flame and a hollow cathode lamp light source of cadmium, zinc, lead and other elements; a quartz catalytic tube having an inner diameter of 19 mm and an outer diameter of 22 mm arranged behind the atomic absorption detection device; the quartz catalytic tube includes a flame buffer zone and an oxide particle adsorption packing zone packed with calcium oxide and manganese dioxide, which are arranged in a listed sequence; an atomic absorption mercury measuring device arranged behind the quartz catalytic tube; the atomic absorption mercury measuring device includes a mercury enrichment tube packed with gold-plated quartz sand, an atomic absorption detector AA2 and an air pump, which are arrange in a listed sequence.

Second Embodiment

According to the device of the first embodiment of the present application, under an air atmosphere, the air flow rate is 350 mL/min; the sample is heated to 1100° C. in the sample heating zone for combustion and pyrolysis, and the cadmium, zinc, and lead are selectively captured by the high-temperature packing at temperature 850° C., and the mercury element is purged into the atomic absorption mercury measuring device for measurement; that is, during the combustion after air is introduced, the combustion products ejected from the right end of 4 form a stable high-speed airflow 5, which is injected into the quartz tube 8 of the mercury measuring system B; 11 refers to a dual-beam cold-atom fluorescence mercury measuring device, which is used to detect the mercury released through the pyrolysis from 10. 12 refers to an air suction pump, which is used to provide the motive gas for the combustion products ejected from the end of 4 flowing in 8, 9, 10, and 11. After the combustion process, the combustion products are pumped into unit B to complete the accurate measurement of mercury in the sample.

After switching to a nitrogen/hydrogen atmosphere, the sample continues to be heated, the gas purges the quartz tube, cadmium, zinc, and lead are released, and the combustion ash of the sample and the cadmium, zinc, and lead and other elements that may be adsorbed in 3 are rapidly released under the reducing atmosphere of hydrogen, and are carried by the nitrogen-hydrogen mixed gas through 4, 4 refers to a quartz collimating tube, which may aggregate and concentrate the analytes released in 2 and 3 into a beam. Since 4 is maintained at high temperature of 850 degrees, the nitrogen and hydrogen gas ejected from the end of 4 is ignited to form the flame 5. Cadmium, zinc, lead and other elements are atomized in the flame and enter the atomic absorption detector AA2 for detection. Under the irradiation of the characteristic spectrum 6-3, atomic cadmium, zinc, lead and other elements selectively absorb light, and the light 7-4 attenuated by the flame is detect by 7, thereby obtaining the content of cadmium, zinc, lead and other elements.

Third to Eighth Embodiments

Rice, soil and standard solution are selected as samples, the device of the first embodiment and the method described in the second embodiment are respectively used, and the measurement results are shown in Table 1. Compared with the conventional technology of ICP-MS and GF-AAS, the results show that the accuracy is good.

TABLE 1

Measurement and comparison results of cadmium (Cd) (using cadmium hollow cathode lamp and photomultiplier tube detector)

| Sample | | Measurement concentration (μg/kg) | | |
|---|---|---|---|---|
| | | Present method | ICP-MS | GF-AAS |
| Third Embodiment | Rice 1 | 12.2 ± 0.2 | 12.3 ± 0.2 | 11.9 ± 0.2 |
| Fourth Embodiment | Rice 2 | 199.2 ± 6 | 198.7 ± 5 | 198.3 ± 6 |
| Fifth Embodiment | Soil 1 | 478 ± 10 | 492 ± 11 | 485 ± 10 |
| Sixth Embodiment | Soil 2 | 1218 ± 23 | 1203 ± 25 | 1231 ± 28 |
| Seventh Embodiment | Standard solution 50 ppb | 49.2 ± 1.1 | 50.1 ± 1.1 | 49.6 ± 1.2 |
| Eighth Embodiment | Standard solution 1000 ppb | 1000.9 ± 11 | 1002.4 ± 11 | 998.8 ± 10 |

Ninth Embodiment

The salt and soy sauce are selected for the measurement of the recovery rate of standard addition. The results are shown in Table 2. As can be seen from Table 2, the recovery rates of standard addition are satisfactory. The measurement of cadmium in high-salt samples is a difficult problem in the field of analysis. The following data shows that the analysis method according to the present application has the ability to resist high-salt interference, and is a direct injection analysis with high method superiority.

TABLE 2

Measurement of cadmium in high-salt samples and recovery rate of standard addition (using cadmium hollow cathode lamp and photomultiplier tube detector)

| Sample | Injection quality (g) | Concentration of standard addition Cd (ng) | Measurement value of present method | Recovery rate of standard addition (%) |
|---|---|---|---|---|
| Salt | 0.10 | 0 | Not detected | / |
| Salt of standard addition | 0.10 | 20 | 20.2 | 101 |
| Soy sauce | 0.30 | 0 | 2.1 | / |
| Soy sauce of standard addition | 0.30 | 10 | 11.7 | 96 |

Tenth Embodiment

Soil samples are selected and the data that cadmium, zinc, lead, mercury are simultaneously analyzed are shown.

TABLE 3

Results of the simultaneous measurement of cadmium, zinc, lead and mercury (using a compound glow discharge lamp and CCD detector to measure cadmium, zinc and lead)

| Solid reference material | | Measured value of present method (mg/kg) | | | | Standard reference value (mg/kg) | | | |
|---|---|---|---|---|---|---|---|---|---|
| Name | Code | Cd | Hg | Zn | Pb | Cd | Hg | Zn | Pb |
| Soil reference material | GSS-4 | 0.34 ± 0.01 | 0.58 ± 0.01 | 201 ± 5 | 55 ± 3 | 0.35 ± 0.06 | 0.59 ± 0.05 | 210 ± 13 | 58 ± 5 |
| Soil reference material | GSS-5 | 0.13 ± 0.01 | 0.31 ± 0.01 | 499 ± 20 | 542 ± 12 | 0.13 ± 0.03 | 0.29 ± 0.03 | 494 ± 25 | 552 ± 29 |
| Soil reference material | GSS-6 | 0.48 ± 0.02 | 0.078 ± 0.002 | 98 ± 2 | 310 ± 10 | 0.45 ± 0.06 | 0.072 ± 0.007 | 97 ± 6 | 314 ± 13 |

Only preferred embodiments of the present disclosure are described above. It should be noted that, for the person skilled in the art, a few of modifications and improvements may be made to the present disclosure without departing from the principle of the present disclosure, and these modifications and improvements are also deemed to fall into the scope of the present disclosure defined by the claims.

The invention claimed is:

1. A device for simultaneously measuring mercury, cadmium, zinc, and lead, comprising:
    a gas generating device;
    a quartz analysis tube connected to the gas generating device; wherein the quartz analysis tube comprises a sample heating zone, a high-temperature packing zone and a quartz collimating tube arranged in a listed sequence;
    an atomic absorption detection device AA1 arranged behind the quartz analysis tube; wherein the atomic absorption detection device comprises an atomic absorption detector, a flame, and a light source;
    a quartz catalytic tube arranged behind the atomic absorption detection device; wherein the quartz catalytic tube comprises a flame buffer zone and an adsorption packing zone arranged in sequence; and
    an atomic absorption mercury measuring device arranged behind the quartz catalytic tube; wherein the atomic absorption mercury measuring device comprises a mercury enrichment tube, an atomic absorption detector AA2 and an air pump arranged in a listed sequence.

2. The device according to claim 1, wherein the gas generating device comprises an air generator and a nitrogen/hydrogen generator; the light source is a lamp with composite elements of cadmium, zinc, and lead;
    the gas generating device comprises the air generator and the nitrogen/hydrogen generator;
    the nitrogen/hydrogen generator comprises:
    an air source;
    a hydrogen generating device;
    a combustion head configured to ignite air and hydrogen; and
    a water vapor structure configured to condense water vapor generated by combustion, wherein the water vapor structure is provided with an air inlet connected to the air source, a hydrogen inlet connected to the hydrogen generating device, and a generated gas outlet arranged at a top of the water vapor structure.

3. The device according to claim 1, wherein, in the quartz analysis tube, the sample heating zone and the high-temperature packing zone both have an inner diameter of 19 mm and an outer diameter of 22 mm, the quartz collimating tube has an outer diameter of 4 mm and an inner diameter of 2 mm; the quartz catalytic tube has an inner diameter of 19 mm and an outer diameter of 22 mm; and the mercury enrichment tube has an inner diameter of 3 mm and an outer diameter of 5 mm.

4. The device according to claim 1, wherein a packing in the high-temperature packing zone is magnesium oxide, or calcium oxide or kaolin; a packing in the adsorption packing zone is one or more of calcium oxide and manganese dioxide; and the mercury enrichment tube is packed with gold-plated quartz sand.

5. The device according to claim 1, wherein the mercury enrichment tube is connected to an outlet of the adsorption packing zone.

6. A method for simultaneously measuring mercury, cadmium, zinc, and lead by using the device according to claim 1, comprising:
    A) under an air atmosphere provided by the gas generating device, combusting and pyrolyzing sample in the sample heating zone of the quartz analysis tube; selectively capturing partially volatile cadmium, zinc, and lead by high-temperature packing in the high-temperature packing zone; and mercury element converging in the quartz collimating tube, being adsorbed and purified in the quartz catalytic tube, and entering the cold atomic absorption detector AA2 for mercury element measurement; and
    B) switching the gas generating device to a nitrogen/hydrogen atmosphere, continually heating the sample, purging the quartz analysis tube by the gas, and cadmium, zinc, and lead being released and entering the atomic absorption detector AA1 for detection.

7. The method according to claim 6, wherein an air flow rate is 200 mL/min to 1000 ml/min; a ratio of nitrogen/hydrogen mixed gas is nitrogen: hydrogen=(0.1 to 10):1, and a flow rate of the mixed gas is 100 mL/min to 1000 mL/min.

8. The method according to claim 6, wherein a heating temperature of the sample heating zone is 200° C. to 1100° C.; a heating temperature of the high-temperature packing zone is 500° C. to 1100° C.; and a heating temperature of the quartz collimating tube is 500° C. to 1100° C.

9. The method of claim 6, wherein the atomic absorption detector AA1 is a CCD scanning fiber spectrometer; an analysis wavelength of cadmium is 228.8 nm, an analysis wavelength of zinc is 213.8 nm, an analysis wavelength of lead is 283.3 nm; and the light source is a hollow cathode lamp with composite elements of cadmium, zinc and lead, or a single element lamp, or other glow discharge lamp.

10. The method according to claim 6, wherein a flow rate of an air suction pump is 200 mL/min to 2000 mL/min, and the atomic absorption mercury measuring device comprises a dual-beam cold atomic absorption detector AA2, which uses a low-pressure mercury lamp as a light source, and a photodiode as a detector.

* * * * *